DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 16, 1969

869 O.G. 711

T869,004
GAP TRANSFER OF TONED ELECTROSTATIC IMAGE

Morris B. Culhane, 400 Plymouth Ave. N., Rochester, N.Y. 14650

Filed Feb. 16, 1968, Ser. No. 706,120
Int. Cl. G03g *13/16, 15/16*
U.S. Cl. 96—1.4
2 Sheets Drawing. 9 Pages Specification

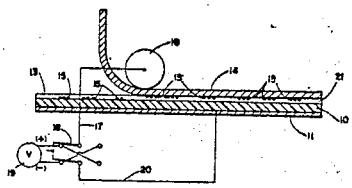

An apparatus and process is provided whereby a previously charged, exposed, and developed photoconductive surface has a charged toner image which is transferable from the photoconductive surface across a fluid gap to a receiver which does not move relative to the photoconductive surface during transfer. In one embodiment a pair of spaced shims are used to provide a fluid gap between a planar photoconductive surface and a receiver. In another embodiment, a fluid gap is provided between a drum having a photoconductive surface and a receiver attached to a roller. In a third embodiment, image transfer is made from a flexible photoconductive web to a receiver on a rotatable wheel or drum.

MISSING PAGE TEMPORARY NOTICE

PATENT # T 869,004 FOR ISSUE DATE 12-16-1969

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

ALL DRAWINGS